(12) United States Patent
Zhou et al.

(10) Patent No.: US 11,952,284 B2
(45) Date of Patent: Apr. 9, 2024

(54) SYSTEMS OF PRODUCING CALCIUM AND MAGNESIUM CARBONATE FROM THE CA/MG CONTAINING SOLUTION LEACHED BY A $CO_2$-BASED HYDROMETALLURGICAL PROCESS

(71) Applicant: Greenore Cleantech (Shanghai) Co., Ltd, Shanghai (CN)

(72) Inventors: Xiaozhou Zhou, Shanghai (CN); Huangjing Zhao, Shanghai (CN)

(73) Assignee: GREENORE CLEANTECH (SHANGHAI) CO., LTD, Shanghai (CN)

( * ) Notice: Subject to any disclaimer, the term of this patent is extended or adjusted under 35 U.S.C. 154(b) by 811 days.

(21) Appl. No.: 17/024,737

(22) Filed: Sep. 18, 2020

(65) Prior Publication Data
US 2021/0380431 A1 Dec. 9, 2021

(30) Foreign Application Priority Data

Jun. 5, 2020 (CN) .......................... 202010507902.X

(51) Int. Cl.
*B01J 8/24* (2006.01)
*B01J 6/00* (2006.01)
(Continued)

(52) U.S. Cl.
CPC ............. *C01F 11/185* (2013.01); *B01J 6/001* (2013.01); *B01J 8/24* (2013.01); *C01F 5/24* (2013.01); *C01P 2004/61* (2013.01)

(58) Field of Classification Search
CPC .. C01F 11/185; C01F 5/24; C01F 5/06; C01F 11/00; C01F 11/06; C01F 11/181;
(Continued)

(56) References Cited

FOREIGN PATENT DOCUMENTS

| CN | 110921688 A | * | 3/2020 | ................ C01F 5/02 |
| JP | 2000144271 A | * | 5/2000 | |
| KR | 20190055426 A | * | 5/2019 | |

OTHER PUBLICATIONS

Machine translation of CN-110921688 B1 (Year: 2023).*

* cited by examiner

*Primary Examiner* — Huy Tram Nguyen
(74) *Attorney, Agent, or Firm* — Bayramoglu Law Offices LLC

(57) ABSTRACT

The present invention discloses the systems of producing calcium and magnesium carbonate from the Ca/Mg containing solution leached by a $CO_2$-based hydrometallurgical process which includes: a precipitation reactor that the Ca/Mg containing leached solution is continuously added and fully mixed with the alkaline reagent at specific mole ratio into the precipitation reactor and the reactor also comprises a $CO_2$ bubbling module where $CO_2$ is captured and recirculated from the thermal decomposition process as needed; a solid-liquid separation unit that the treated slurry is treated by the solid-liquid separation unit to produce precipitated calcium and magnesium carbonate products where the recirculating water is recycled back into the precipitation reactor; a thermal decomposition unit that the calcium and magnesium carbonate products is calcined by the thermal decomposition unit to produce an alkaline reagent and the alkaline reagent is recycled back into the precipitation reactor for the next batch of reaction.

20 Claims, 2 Drawing Sheets

(51) Int. Cl.
*C01F 5/24* (2006.01)
*C01F 11/18* (2006.01)

(58) Field of Classification Search
CPC ... C01F 11/18; B01J 6/001; B01J 8/24; C01P 2004/61; C01P 2004/82; C01P 2006/65; C01P 2006/80; Y02P 40/40; C04B 2/005; C04B 2/106; C22B 1/02; C22B 26/20; C22B 7/006; C22B 7/04; C22B 26/22
USPC .......................................................... 422/608
See application file for complete search history.

SYSTEMS OF PRODUCING CALCIUM AND MAGNESIUM CARBONATE FROM THE CA/MG CONTAINING SOLUTION LEACHED BY A CO₂-BASED HYDROMETALLURGICAL PROCESS

CROSS REFERENCE TO THE RELATED APPLICATION

This application is based upon and claims priority to Chinese Patent Application No. 202010507902.X, filed on Jun. 5, 2020, the entire contents of which are incorporated herein by reference.

TECHNICAL FIELD

The present invention relates to the preparation technology of calcium and magnesium carbonate, carbon capture, utilization and sequestration (CCUS), and industrial solid waste valorization, specifically referring to a system of producing calcium and magnesium carbonate from the Ca/Mg containing solution leached by a $CO_2$-based hydrometallurgical process.

BACKGROUND

Underutilization and direct disposal of waste materials, such as industrial solid waste generated by steel mills, power plants, aluminum smelters and mine tailings, can lead to contamination of soil, water and air and other derivative environmental issues. In iron and steel making industry, if the sulfur and phosphorus content in the pig iron is higher than accepted, a large amount of lime (limestone or dolomite) is used during the smelting process. Therefore, major technical advances are required to enable recovering calcium and magnesium carbonates from industrial wastes either by directly extracting calcium and magnesium based carbonates, or producing calcium and magnesium based carbonates through $CO_2$ mineralization which is able to reduce and reuse waste materials at the same time.

Meanwhile, precipitated calcium carbonate (PCC) and ground calcium carbonate (GCC) are widely used as the filler material in paper, paint and rubber manufacturing. Especially in the paper industry, calcium carbonate, from both PCC and GCC, is used to decrease the unit usage of paper pulp in the feedstock, reduce the total cost of papermaking, and improve the quality of paper, such as whiteness, brightness, purity and etc. With China's recent order and relevant law of embargoing foreign garbage and plastic import, the demand and consumption of paper products are increased which pushes the price of paper pulp higher as well. Since the price of calcium carbonate is only ⅕-⅓ of that for pulp, the advantages significantly emerge by increasing the amount of high-quality calcium carbonate as paper fillers.

Conventional calcium carbonate preparation methods are still commonly applied by calcium carbonate manufacturers, such as American enterprise Mineral Technology, French enterprise Imerys, and Swiss enterprise Omya. Lackner et al. used the decomposition or carbonization cycle of calcium carbonate for carbon dioxide capture ($CO_2$ Capture). The problem of this method is the deactivation of MO (metal oxide) due to the closure of pores and the loss of particle and pore surface area after a certain number of cycles and therefore the capacity and efficiency of re-carbonization greatly subside.

Conventional preparation method to generate precipitated calcium carbonate is shown below.

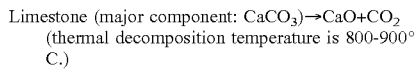
(thermal decomposition temperature is 800-900° C.)

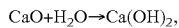

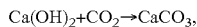

Traditional hydrometallurgical leaching method is shown below which uses strong acid to prepare calcium and magnesium containing solution from calcium and magnesium bearing minerals/industrial waste:

Calcium and magnesium bearing minerals/industrial waste+HCl/HNO₃→Ca/MgCl₂ or Ca/Mg(NO₃)₂

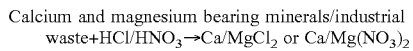

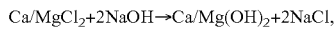

Or,

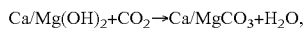

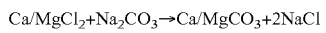

The current raw material used for calcium carbonate preparation process mainly relies on limestone which comprises of mining, transportation, crushing and ball milling. However, the over-extraction of limestone mine will lead to deforestation, environmental pollution, and other related issues. At the same time, as the depletion of high-purity limestone mine, the corresponding resources is more likely to be found available at remote regions which increases the associated transportation cost. Moreover, more impurities may be needed to be removed during the preparation process since the quality of limestone mine downgrades, which eventually has a corresponding impact on the total production cost and the quality of the final product. For environmental protection purpose, the current technical bottleneck is how to develop a system that is able to recover calcium and magnesium carbonate directly from industrial waste or extract by carbon dioxide mineralization in order to minimize the dependence on limestone mines.

Ball milling and calcination are both energy intensive processes. Due to the hardness and crystal structure of limestone, it would cause the relatively high abrasion of the ball milling equipment. As the particle size of limestone fed into the ball milling decreases, the efficiency of calcination increases and the related energy consumption can be reserved while the ball milling itself may consume more energy instead. Therefore, it is still a big challenge to find the balance between the ball milling and the calcination.

The traditional hydrometallurgical extraction using strong acid to prepare calcium and magnesium carbonate from calcium and magnesium bearing minerals and industrial wastes not only consumes a large amount of acid for dissolution, but also consumes a large amount of alkaline, mainly sodium hydroxide, to produce the final products. The technical limitations of this process are how to minimize the acid and the alkaline consumption, reducing the total cost and the generation of waste acid and alkaline.

SUMMARY

In order to improve the technical shortcomings and limitations described above, the present invention proposes a system of producing calcium and magnesium carbonate from the Ca/Mg containing solution leached by a $CO_2$-based hydrometallurgical process.

To solve the technical issues described above, the following embodiments are proposed:

The present invention proposes a system of producing calcium and magnesium carbonate from the Ca/Mg containing solution leached by a $CO_2$-based hydrometallurgical process which comprises:

Precipitation reactor: the leaching solution containing calcium and magnesium ions is continuously added and fully mixed with the alkaline reagent at specific volume ratio into the precipitation reactor, wherein, if needed, the precipitation reactor also comprises a $CO_2$ bubbling module where $CO_2$ is captured and recirculated from the calcination process.

Solid-liquid separation unit: the fully reacted slurry is filtered by a solid-liquid separation unit to produce calcium and magnesium based precipitated products along with recycled water where the recycled water is circulated back into the precipitation reactor.

Thermal decomposition unit: the calcium and magnesium carbonate products is calcined by the thermal decomposition unit to produce a alkaline reagent. The alkaline reagent is recycled back into the precipitation reactor.

Furthermore, the system described above also comprises a pretreatment unit which is designed to remove impurities from the leached Ca/Mg containing solution.

Furthermore, in the system described above, the leached Ca/Mg containing solution is continuously added into the precipitation reactor at the mole ratio <1 between alkaline reagent and the leached Ca/Mg containing solution.

Furthermore, in the system described above, the leached Ca/Mg containing solution is prepared by a $CO_2$-based hydrometallurgical process and the pH value of the leached solution is nearly neutral or slightly acidic with certain level of dissolved $CO_2$.

Furthermore, in the system described above, the calcium and magnesium based precipitated products acquired by the solid-liquid separation unit is partially proceeded to be prepared into Ca/Mg carbonate slurry or is formulated into Ca/Mg carbonate powder by a drying module. Moreover, some of the calcium and magnesium based precipitated products after crushing is used to prepare the alkaline reagent by calcination through the thermal decomposition unit.

Furthermore, in the system described above, the alkaline reagent contains calcium and magnesium oxides.

Furthermore, in the system described above, one of the designs of the thermal decomposition unit comprises a fluidized bed. After dispersion in the fluidized bed, more than 99% of the Ca/Mg carbonate could have particles sizes less than 300 μm and the particle sizes after calcination are mostly less than 100 μm.

Furthermore, in the system described above, during the process of Ca/Mg carbonate calcination in the fluidized bed, the bed height of the dense phase will significantly increase when $U_3>U_g>U_1>U_2$. The bed height increases until the thermal decomposition of Ca/Mg carbonate particles is completed. At this point, the calcined Ca/Mg based oxide particles can be entrained and collected by increasing $U_g$.

Thereinto, the average minimum fluidization velocity of Ca/Mg carbonate particles is $U_1$, the average minimum fluidization velocity of Ca/Mg oxide particles is $U_2$, the entrainment velocity of Ca/Mg oxide particles is $U_3$, the inlet fluidizing gas velocity is $U_g$.

Furthermore, in the system described above, the Ca/Mg based oxide particles derived from the calcination can be entrained and collected when $U_g>U_3>U_1>U_2$.

Furthermore, in the system described above, during the process of calcination in the fluidized bed, when $U_g>U_2>U_1$, $U_g$ needs to be tuned less than $U_3$. Meanwhile, the bed height of the dense phase will significantly decrease when the thermal decomposition of Ca/Mg carbonate particles begins and will last until the thermal decomposition is completed. The calcined Ca/Mg based oxide particles can be entrained and collected by increasing $U_g$ larger than $U_3$.

Furthermore, in the system described above, the inlet fluidizing gas comprises hot air and recycled $CO_2$ which $CO_2$ is mainly utilized for the particle entrainment and collection after the calcination.

Furthermore, in the system described above, the temperature of calcination in the thermal decomposition unit is between 800-900° C.

Furthermore, in the system described above, $CO_2$ generated from thermal decomposition unit is circulated back into the $CO_2$ bubbling module where $CO_2$ is captured and recycled back into the precipitation reactor as a supplement to prepare calcium and magnesium precipitated products.

Compared with current technologies, the present invention has the technical advantages as shown below:

The present invention provides a recovery and valorization system for the industrial wastes by extracting calcium and magnesium carbonates or producing calcium and magnesium carbonates via $CO_2$ mineralization. It enables a more complete and plausible way of using the waste material which is more environmentally friendly with lowered production cost.

The present invention is based on extraction and precipitation by mainly $CO_2$ which eliminates the consumption of large quantities of strong acid and strong alkaline widely used in current technologies. It is able to overcome the challenges of generating waste acid, waste alkaline and waste water in large volume.

Traditional thermal decomposition process of calcining Ca/Mg carbonates is rather energy intensive. The efficiency and energy consumption of calcination are limited by the particle size of feedstock (crushing, rod milling and ball milling). The present invention only requires mild physical crushing of the air dried Ca/Mg carbonates procured from the solid-liquid separation unit. Moreover, in traditional calcination process, the quality of Ca/Mg based products is limited by the feedstock (limestone and dolomite). In the present invention, the particle impurities and the dissolved impurity ions in the feedstock are separated by the pretreatment units. Therefore, the whiteness index of the Ca/Mg carbonates generated from the present invention can reach 96 and the purity can be over 99%. Moreover, the leached solution without removing the impurities can be used to generate the low-cost Ca/Mg oxides products to substitute the limestone or dolomite. Furthermore, the product of the present invention is a composite carbonates of calcium carbonate and magnesium carbonate which the weight percent of calcium carbonate is between 90%-92% and the weight percent of magnesium carbonates is between 8%-10%. All the indexes of the products can be parallel to similar calcium carbonate and magnesium carbonate products.

The present invention can achieve more efficient calcination and more precise separation of calcium and magnesium carbonates by accurately adjusting the inlet fluidizing gas velocity based on the dense phase bed height and the different fluid dynamics properties of particles with different chemical composition before and after the calcination in the fluidized bed.

The present invention is able to sequester and valorize $CO_2$ emission while minimizing the consumption of extra material and energy to achieve the goal of a near zero-emission.

BRIEF DESCRIPTION OF THE DRAWINGS

In accordance with the following detailed description of a non-restrictive embodiment's figure shown below, the improvement of the present invention will be explicitly illustrated in terms of features, purposes and advantages.

DETAILED DESCRIPTION OF THE EMBODIMENTS

To further explicitly demonstrate the purpose, characteristics and performance of this application, a further explanation will be combined with attached figures in order to fully illustrated the detailed concept, concrete arrangement and technical purposes of the system.

With respect to one of the embodiments for systems of producing calcium and magnesium carbonate from the Ca/Mg containing solution leached by a $CO_2$-based hydrometallurgical process. shown in FIG. 1, the flowsheet is described as follows:

Precipitation reactor (10): the leached solution containing calcium and magnesium is continuously added and fully mixed with alkaline reagent (M) at specific mole ratio into the precipitation reactor (10), wherein, the precipitation reactor (10) also comprises a $CO_2$ bubbling module where $CO_2$ is captured and recirculated from the thermal decomposition process as a supplement.

Solid-liquid separation unit (20): the treated slurry transferred from the precipitation reactor (10) is processed by the solid-liquid separation unit (20) to produce the calcium and magnesium based precipitated products (A1) and the recycled water (B) where the recycled water (B) is circulated back and used in the slurry preparation of the next cycle of $CO_2$ hydrometallurgical process.

Thermal decomposition unit (30): the calcium and magnesium carbonate product (A2) is calcined by the thermal decomposition device (30) to produce an alkaline reagent (M). The alkaline reagent (M) is recycled back into the precipitation reactor (10) for the next cycle of reaction.

In this embodiment, the leached Ca/Mg containing solution is prepared by a $CO_2$-based hydrometallurgical process and the pH value of the leached solution is nearly neutral or slightly acidic (pH<7) with certain level of dissolved $CO_2$.

Figure 1:
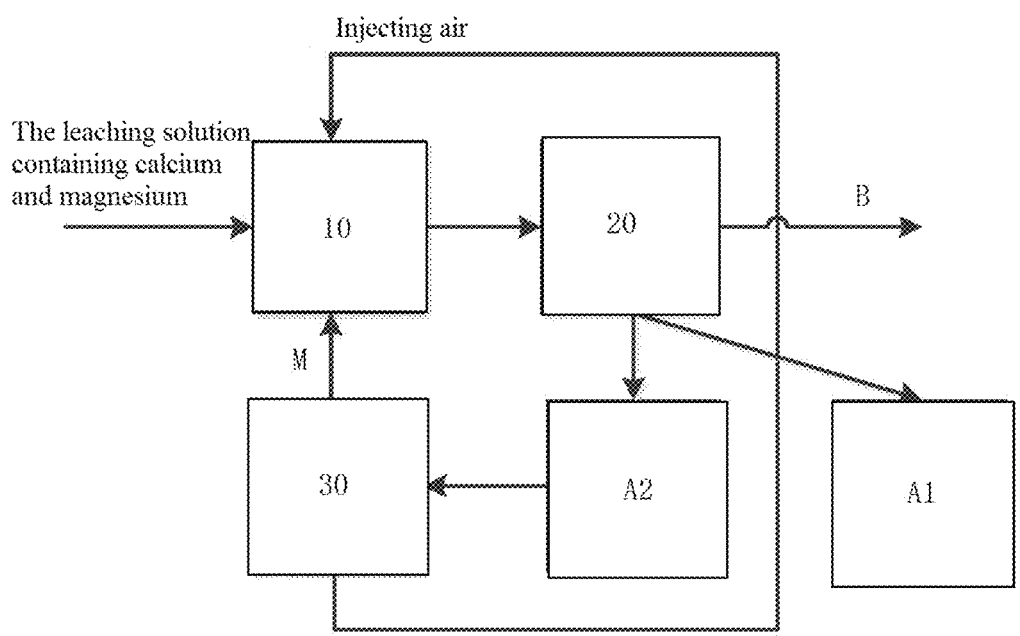
FIG. 1: Process Flowsheet of The Present Invention as Systems of Producing Calcium and Magnesium Carbonate from the Ca/Mg Containing Solution Leached by a $CO_2$-based Hydrometallurgical Process.

Furthermore, this embodiment also comprises a pretreatment unit which is not shown in FIG. 1. The pretreatment unit is arranged to remove impurities from the leached solution so that the treated solution is able to be used for high purity calcium and magnesium carbonates production. For low purity calcium and magnesium carbonates generation, the pretreatment unit can be eliminated. In this embodiment, besides the target elements of calcium and magnesium, the leached solution may also contain impurity ions such as iron, silicon, aluminum, etc. Precipitation is performed to remove impurities from the leached solution by physically and/or chemically changing the pH value of the solution through either continuously adding alkaline reagents, adding coagulant and/or flocculant which is less than 1 wt % of the solution, injecting compressed air/steam or heating the solution.

The leached Ca/Mg containing solution is continuously added into the precipitation reactor (10) at the mole ratio <1 per time unit between the alkaline reagent and the leached Ca/Mg containing solution. Furthermore, the $CO_2$ generated from the thermal decomposition unit is transferred back into the $CO_2$ bubbling module where $CO_2$ is captured and recirculated back into the precipitation reactor (10) as a supplement to precipitate calcium and magnesium carbonate products.

In this embodiment, the precipitated calcium and magnesium carbonate products (A1) acquired by the solid-liquid separation unit (20) is partially proceeded to be prepared into Ca/Mg carbonate slurry or is formulated into Ca/Mg carbonate powder by a drying module. Moreover, the rest of the precipitated calcium and magnesium carbonate products (A2) is transferred into the thermal decomposition unit (30) for the alkaline reagent (M) preparation and the alkaline reagent is recycled into the precipitation reactor (10).

Furthermore, the temperature of the calcination in the thermal decomposition unit (30) is between 800-900° C.

Thereinto, the alkaline reagent (M) contains calcium and magnesium oxides.

Figure 2:
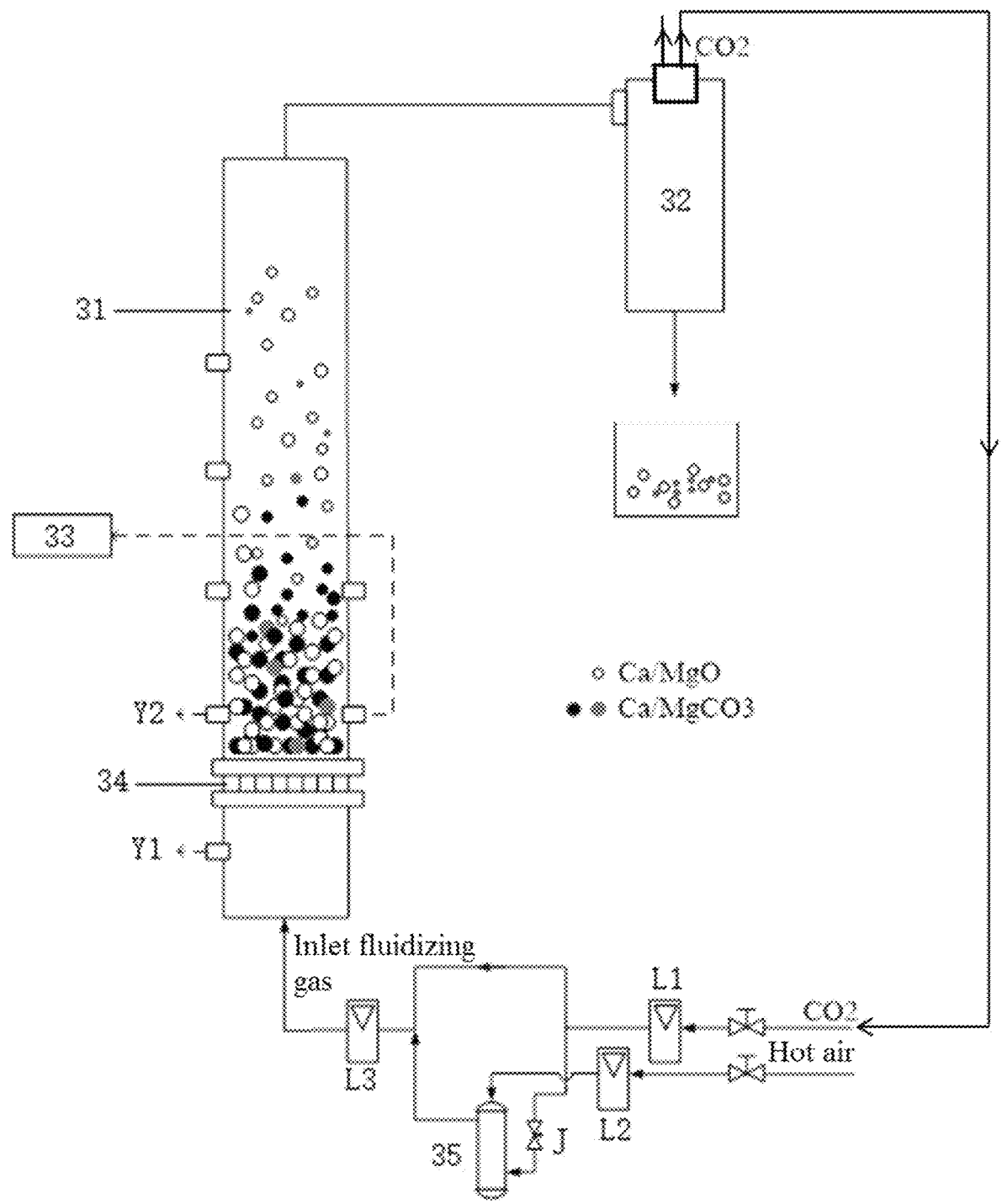
FIG. 2: Schematic Diagram of the Fluidized Bed System of the Present Invention.

As shown in FIG. 2, the thermal decomposition unit (30) comprises a fluidized bed unit. After dispersion in the fluidized bed, more than 99% of the Ca/Mg carbonate could have particles sizes less than 300 μm and the particle sizes after calcination are mostly less than 100 μm.

The fluidized bed unit (31) comprises a fluidized bed and a connected particle collection module (32) where a $CO_2$ outlet module is arranged on the top and a particle outlet module is arranged at the bottom.

In this embodiment, the fluidized bed unit (31) also comprises a recirculating $CO_2$ module and a hot air module which is parallelly arranged with a connector to mix the gas in need. The mixture of $CO_2$ and hot air or one of the inlet fluidizing gas can be blown into the fluidized bed unit (31) to perform reaction and/or fluidization. The first pressure gauge (Y1) and a gas distributor (34) are also installed between the gas supplying modules and the fluidized bed unit (31). The second pressure gauge (Y2) and the bed height measuring meter (33) are also configured on the fluidized bed unit (31).

In the recirculating $CO_2$ module, the first flow meter (L1) is arranged before two branch pipelines. One of the pipelines is set with the third flowmeter (L3) which is connected with the gas mixing module. The other pipeline is connected to a dryer (35) with the flow control valve (J). The first outlet of the dryer (35) is connected with the third flowmeter (L3).

In the hot air transporting module, the second flow meter (L2) is arranged before the dryer (35). The second outlet of the dryer (35) is also connected with the third flow meter (L3).

The density of calcium and magnesium carbonates is between $2.8 \times 10^3$ kg/m$^3$ to $2.9 \times 10^3$ kg/m$^3$ and the density of calcium and magnesium oxides is between $3.3 \times 10^3$ kg/m$^3$ to $3.4 \times 10^3$ kg/m$^3$.

During the process of the calcination of calcium and magnesium carbonate products (A2) in fluidized bed device, the average minimum fluidization velocity of calcium and magnesium carbonate particles is $U_1$, the average minimum fluidization velocity of calcium and magnesium oxide particles is $U_2$, the entrainment velocity of calcium and magnesium oxide particles is $U_3$, the inlet fluidizing gas velocity is $U_g$.

When $U_3>U_g>U_1>U_2$, the calcination of calcium and magnesium carbonates starts and the bed height of the dense phase will significantly increase. The bed height increases until the thermal decomposition of Ca/Mg carbonate particles is completed. At this point, the calcined Ca/Mg based oxide particles can be entrained and collected by increasing $U_g$.

The calcined calcium and magnesium oxide particles can be entrained and collected when $U_g>U_3>U_1>U_2$.

During the process of calcination in fluidized bed, when $U_g>U_2>U_1$, $U_g$ needs to be tuned to be less than $U_3$. Meanwhile, the bed height of the dense phase will significantly decrease when the thermal decomposition of Ca/Mg carbonate particles begins and will last until the thermal decomposition is completed. The calcined Ca/Mg based oxide particles can be entrained and collected by increasing $U_g$ larger than $U_3$.

The inlet fluidizing gas comprises hot air and $CO_2$ of which $CO_2$ is collected and recirculated from the $CO_2$ outlet on the top of the fluidized bed unit after calcination process.

In this embodiment, the $CO_2$ generated from thermal decomposition unit (30) is transferred back into the $CO_2$ module where $CO_2$ is collected and recirculated back into precipitation reactor (10) as a supplement to precipitate calcium and magnesium carbonates.

The present invention provides a recovery and valorization system for the industrial wastes by extracting calcium and magnesium carbonates or producing calcium and magnesium carbonates via $CO_2$ mineralization. It enables a more complete and plausible way of using the waste material which is more environmentally friendly with lowered production cost. The present invention is based on extraction and precipitation by mainly $CO_2$, which eliminates the consumption of large quantities of strong acid and strong alkaline widely used in current technologies. It is able to overcome the challenges of generating waste acid, waste alkaline and waste water in large volume. Traditional thermal decomposition process of calcining Ca/Mg carbonates is rather energy intensive. The efficiency and energy consumption of calcination are limited by the particle size of feedstock (crushing, rod milling and ball milling). The present invention only requires mild physical crushing of the air dried Ca/Mg carbonates procured from the solid-liquid separation unit. Moreover, in traditional calcination process, the quality of Ca/Mg based products is limited by the feedstock (limestone and dolomite). In the present invention, the particle impurities and the dissolved impurity ions in the feedstock are separated by the pretreatment units. Therefore, the whiteness index of the Ca/Mg carbonates generated from the present invention can reach 96 and the purity can be over 99%. Moreover, the leached solution without removing the impurities can be used to generate the low-cost Ca/Mg oxides products to substitute the limestone or dolomite. Furthermore, the product of the present invention is a composite carbonates of calcium carbonate and magnesium carbonate which the weight percent of calcium carbonate is between 90%-92% and the weight percent of magnesium carbonates is between 8%-10%. All the indexes of the products can be parallel to similar calcium carbonate and magnesium carbonate products. The present invention can achieve more efficient calcination and more precise separation of calcium and magnesium carbonates by accurately adjusting the inlet fluidizing gas velocity based on the dense phase bed height and the different fluid dynamics properties of particles with different chemical composition before and after the calcination in the fluidized bed. The present invention is able to sequester and valorize $CO_2$ emission while minimizing the consumption of extra material and energy to achieve the goal of a near zero-emission. In conclusion, this invention has broad market potential.

The embodiment addressed above is intended to explain the concrete arrangement of the present invention in details with reference to one of the best embodiments for carrying out the invention, but the invention is not limited by this embodiment. It should be understood by technicians in this field that embodiments of the present invention can be modified or equivalently replaced without departing from the spirit and scope of this invention which shall be all included in the claims of the invention.

What is claimed is:

1. A system for producing calcium and magnesium carbonate, wherein the calcium and magnesium carbonate are produced from a Ca/Mg containing solution leached by a $CO_2$-based hydrometallurgical process, and the system comprises the following:
    a precipitation reactor, wherein the Ca/Mg containing solution is continuously added and fully mixed with an alkaline reagent into the precipitation reactor to form a fully reacted slurry, and the precipitation reactor further comprises a $CO_2$ bubbling module, wherein $CO_2$ is captured and recirculated from a calcination;
    a solid-liquid separation unit, wherein the fully reacted slurry is separated by a solid-liquid separation unit to produce calcium and magnesium carbonate products along with recycled water, wherein the recycled water is circulated back for a preparation of the Ca/Mg containing solution for a next cycle;
    a thermal decomposition unit, wherein the calcium and magnesium carbonate products are calcined by the thermal decomposition unit to produce the alkaline reagent, wherein the alkaline reagent is recycled back into the precipitation reactor.

2. The system according to claim 1, wherein the system further comprises a pretreatment unit and the pretreatment unit is arranged to remove impurities from the Ca/Mg containing solution.

3. The system according to claim 1, wherein the Ca/Mg containing solution is continuously added into the precipitation reactor at a mole ratio <1 between the alkaline reagent and the Ca/Mg containing solution.

4. The system according to claim 1, wherein the Ca/Mg containing solution is prepared by the $CO_2$-based hydrometallurgical process and a pH value of the Ca/Mg containing solution is nearly neutral or slightly acidic with dissolved $CO_2$.

5. The system according to claim 1, wherein the calcium and magnesium carbonate products acquired by the solid-liquid separation unit is partially proceeded to be prepared into a Ca/Mg carbonate slurry or is formulated into a Ca/Mg carbonate powder by a drying module; and part of the calcium and magnesium carbonate products after crushing is used to prepare the alkaline reagent by the calcination through the thermal decomposition unit.

6. The system according to claim 1, wherein the alkaline reagent comprises calcium and magnesium oxides.

7. The system according to claim 1, wherein the thermal decomposition unit further comprises a fluidized bed; after a dispersion in the fluidized bed, more than 99% of Ca/Mg carbonate produced have particles sizes less than 300 μm and the particle sizes after the calcination are less than 100 μm.

8. The system according to claim 7, wherein during calcination in the fluidized bed, a bed height of a dense phase increases when $U_3>U_g>U_1>U_2$, and the bed height increases until a thermal decomposition of Ca/Mg carbonate particles is completed; when the thermal decomposition of the Ca/Mg carbonate particles is completed, calcined Ca/Mg based oxide particles can be entrained and collected by increasing $U_g$, wherein $U_1$ is the average minimum fluidization velocity of the Ca/Mg carbonate particles, $U_2$ is an average minimum fluidization velocity of Ca/Mg oxide particles, $U_3$ is an entrainment velocity of the Ca/Mg oxide particles, $U_g$ is a fluidization velocity of an inlet fluidizing gas.

9. The system according to claim 8, wherein the Ca/Mg based oxide particles derived from the calcination can be entrained and collected when $U_g>U_3>U_1>U_2$.

10. The system according to claim 8, wherein during the calcination in the fluidized bed, when $U_g>U_2>U_1$, $U_g$ needs to be tuned to be less than $U_3$; the bed height of the dense phase decreases as soon as the thermal decomposition of the Ca/Mg carbonate particles begins and until the thermal decomposition of the Ca/Mg carbonate particles is completed, and the calcined Ca/Mg based oxide particles can be entrained and collected by increasing $U_g$ so that $U_g$ is larger than $U_3$.

11. The system according to claim 8, wherein the inlet fluidizing gas comprises hot air and $CO_2$.

12. The system according to claim 1, wherein a calcination temperature in the thermal decomposition unit is between 800° C. to 900° C.

13. The system according to claim 1, wherein $CO_2$ generated from the thermal decomposition unit is circulated back into the $CO_2$ bubbling module where $CO_2$ is captured and recycled back into the precipitation reactor as a supplement to prepare the calcium and magnesium carbonate products.

14. The system according to claim 2, wherein the calcium and magnesium carbonate products acquired by the solid-liquid separation unit is partially proceeded to be prepared into a Ca/Mg carbonate slurry or is formulated into a Ca/Mg carbonate powder by a drying module; and part of the calcium and magnesium carbonate products after crushing is used to prepare the alkaline reagent by the calcination through the thermal decomposition unit.

15. The system according to claim 3, wherein the calcium and magnesium carbonate products acquired by the solid-liquid separation unit is partially proceeded to be prepared into a Ca/Mg carbonate slurry or is formulated into a Ca/Mg carbonate powder by a drying module; and part of the calcium and magnesium carbonate products after crushing is used to prepare the alkaline reagent by the calcination through the thermal decomposition unit.

16. The system according to claim 4, wherein the calcium and magnesium carbonate products acquired by the solid-liquid separation unit is partially proceeded to be prepared into a Ca/Mg carbonate slurry or is formulated into a Ca/Mg carbonate powder by a drying module; and part of the calcium and magnesium carbonate products after crushing is used to prepare the alkaline reagent by the calcination through the thermal decomposition unit.

17. The system according to claim 2, wherein the alkaline reagent comprises calcium and magnesium oxides.

18. The system according to claim 3, wherein the alkaline reagent comprises calcium and magnesium oxides.

19. The system according to claim 4, wherein the alkaline reagent comprises calcium and magnesium oxides.

20. The system according to claim 9, during the calcination in the fluidized bed, when $U_g>U_2>U_1$, $U_g$ needs to be tuned to be $<U_3$; the bed height of the dense phase decreases as soon as the thermal decomposition of the Ca/Mg carbonate particles begins and until the thermal decomposition of the Ca/Mg carbonate particles is completed, and the calcined Ca/Mg based oxide particles can be entrained and collected by increasing $U_g$ so that $U_g$ is larger than $U_3$.

* * * * *